United States Patent [19]

Peters

[11] 4,203,657
[45] May 20, 1980

[54] MICRO IMAGE CASSETTE AND VIEWER

[75] Inventor: Arnis E. Peters, La Crosse, Wis.

[73] Assignee: Northern Engraving Company, Sparta, Wis.

[21] Appl. No.: 896,463

[22] Filed: Apr. 14, 1978

Related U.S. Application Data

[63] Continuation-in-part of Ser. No. 861,523, Dec. 19, 1977.

[51] Int. Cl.² .................. G03B 23/12; G03B 1/48
[52] U.S. Cl. ................................. 353/26 R; 353/95
[58] Field of Search .................. 353/23, 26 R, 26 A, 353/27 R, 95

[56] References Cited

U.S. PATENT DOCUMENTS

| | | | |
|---|---|---|---|
| 2,610,540 | 9/1952 | Beitz | 353/23 |
| 3,733,121 | 5/1973 | Smitzer | 353/23 |
| 3,739,069 | 6/1973 | Sandmeier | 353/26 R |
| 4,087,166 | 5/1978 | Rothbart et al. | 353/26 A |

Primary Examiner—Steven L. Stephan
Attorney, Agent, or Firm—Norman Lettvin

[57] ABSTRACT

An improved filmstrip-carrying cassette, the filmstrip carrying thereon microimages arranged in rows and columns, and a viewer for illuminating, projecting, enlarging and reading on a display screen a selected one of the microimages is provided, using a pair of transparent plates to engage a selected portion of the filmstrip on opposite sides to hold same in a precise focal plane for properly illuminating and projecting the selected microimage. The filmstrip has great width to accommodate multiple rows of microimages, and motor means operate to transport the filmstrip selectively in opposite directions to quickly locate the column in which the desired microimage is located. The cassette is carried by a viewer-mounted carriage that is manually reciprocable along a track, so as to traverse the column in seeking the desired microimage. The transparent plates are separated simultaneously with the energizing of the motor means to permit unfettered movement of the filmstrip. In one form of construction, the transparent plates are carried by the cassette.

In a preferred form, the cassette carries one transparent plate, and the other plate is carried by the viewer's carriage; the motor means provides selectively fast or slow transport, and the transparent plates are caused to separate only during fast transport, to provide visual coordination for locating the selected microimage with the slow transport of the filmstrip. A modular construction for the light projecting portion of the viewer provides for simplicity of adjustment and servicing.

14 Claims, 17 Drawing Figures

MICRO IMAGE CASSETTE AND VIEWER

CROSS REFERENCE TO RELATED APPLICATIONS

This application is a continuation-in-part of my co-pending application, Ser. No. 861,523, filed Dec. 19, 1977.

FIELD OF THE INVENTION

This invention relates to microfilm cassettes and viewers for illuminating, enlarging, projecting and displaying selected frames of the microfilm on a viewing screen and more particularly to a novel cassette and viewer specially adapted to position microimage frames for projection in a pre-selected focal plane.

BACKGROUND OF THE INVENTION

The printing of microimages on microfiche cards and the use of viewers for illuminating, enlarging, projecting and displaying selected frames of the cards on a viewing screen is well known in the art. The printing of microimages on filmstrips and the use of viewers for illuminating, enlarging, projecting and displaying selected frames of the filmstrip on a viewing screen is also well known in the art.

It is further known to house the filmstrip on a cassette for presenting a length of flexible film for projection and display. By storing information on a microfilmstrip, an entire book or a lengthy catalog of parts may be stored on a single compact cassette. The prior art, as evidenced by U.S. Pat. No. 3,700,321, has fixedly located a generally U-shaped cassette with a microimage holding bight portion window between an illuminating system and a lens assembly to precisely align a selected microimage with the optical system of the viewer.

There exist countless situations in which it would be advantageous to store a greater number of microimage frames on a single filmstrip. For example, it is desirable to store a full set of volumns of a given reference or the entire inventory of a given company within a single cassette. To this end, previous patents such as U.S. Pat. No. 3,319,517 have provided a cassetted filmstrip, the transverse dimension thereof being great enough to include a plurality of rows of microimages so as to substantially increase the amount of printed matter that can be stored in a single cassette.

As the width of the cassetted filmstrip was increased, it became necessary to modify existing viewer-cassette assemblies to accept, project and display selected microimage frames regardless of their longitudinal or transverse location on the filmstrip. Early microfiche viewers provided for manual movement of a fiche supporting table in both transverse and longitudinal directions to align a selected microimage between a lower source of illumination and an upper projection lens system. As technology advanced and 8 and 16 mm cassetted microfilm supplanted microfiche, there was no need to traverse the width of the film. Because the transverse dimension of the filmstrip was relatively small, its full width could be projected onto the viewing screen.

With the continuing development of microfilm technology came the advent of wider microfilmstrips. As the full filmstrip width could no longer be displayed on the viewing screen at one time, it became necessary to incorporate a transverse filmstrip scanner into the viewer assembly. One type of scanner was developed in U.S. Pat. No. 3,319,517. The scanner basically included a transport assembly on which the film spools were secured for slidable movement relative to a lens projection assembly. However, the filmstrips of that and other prior art devices were not housed in a cassette and therefore were easily scratched and otherwise injured by the constant human handling necessary to prepare the filmstrip for projection.

It is accordingly a major purpose of the present invention to provide a cassette for housing and transporting filmstrips having transverse dimensions great enough to house a large number of microimage frames thereacross and to provide a viewer having a movable carriage in which the cassette is placed for scanning and projecting those transverse microimage frames.

Of course, the filmstrip length is many times greater than its width. With this in mind, prior viewer systems incorporated drive assemblies for the selective longitudinal transportation of the filmstrip within the cassette. However, none of the previous systems employed a movable carriage for transversely scanning the width of a cassetted filmstrip.

It is yet another object of the present invention to provide a viewer having a movable carriage for holding a cassette and in which the drive means for transporting the filmstrip and presenting selected longitudinal microimage frames for projection are mounted on the carriage for movement therewith.

Many previous viewers for projecting and displaying filmstrips such as the viewer shown in U.S. Pat. No. 3,319,517 have tensioned the filmstrip over a plastic plate so as to hold the filmstrip in the focal plane of the objective projecting lens. But the constant contact between the filmstrip and the plate often caused scratching or other injury of the filmstrip which seriously interfered with the projected image because of the optical magnification occasioned by the viewer. Other viewers held the filmstrip in the focal plane by supporting the longitudinal edges thereof in the area about the optical path of projected light. Of course, as the width of the film increased, such support means failed to adequately maintain the entire filmstrip width under sufficient tension, thereby having sections thereof buckle out of the focal plane.

One additional object of the present invention is to provide a pair of transparent glass plates between which a filmstrip, regardless of width, may be disposed in non-contacting positions for longitudinal movement without contacting either plate and which plates cooperate with a lens assembly housed in the viewer to clamp the entire width of the filmstrip between the plates into a focusing plane only when the filmstrip is not being moved.

A further object of this invention is to provide a filmstrip-carrying cassette and viewer construction, of the type using opposed transparent plates for holding a portion of the filmstrip of the cassette in a focal plane, wherein one of the plates is carried by and constitutes part of the cassette and the other of the plates is carried by the viewer's carriage which supports the cassette.

And another object of the invention is to provide a filmstrip-carrying cassette and viewer construction, wherein the transport of the filmstrip within the cassette may be selectively controlled for fast or slow transport, and wherein the cassette's filmstrip is caused to be free of restraints during fast transport, but is, during slow transport, kept in such a focal condition that the slow transport may be simultaneously coordinated with viewing the projected microimage so as to afford efficiency in locating the desired microimage to be projected and viewed. More specifically, the filmstrip of the cassette that is normally clamped between two transparent plates to be held in a focal plane, is to be completely released during fast transport, but is still to be held substantially in the focal plane during slow transport.

And still a further object of this invention is to provide a modular construction for the light projecting portion of the viewer, which provides for simplicity of adjustment and servicing of the parts thereof.

These as well as further objects and advantages will become apparent from the detailed explanation of the invention that is provided in the description and claims, and is illustrated in the accompanying drawings.

BRIEF DESCRIPTION OF THE INVENTION

A cassette houses spaced spools upon which portions of an elongated microimage bearing filmstrip are wound. The filmstrip is longitudinally movable within the cassette in incremental amounts for traversing an elongated filmstrip passageway. An aperture is formed through the passageway for permitting projected light to pass through a selected portion of the filmstrip for enlarging and displaying one of the longitudinally and transversely-extending microimage frames. Apparatus is provided for positioning the selected microimage frame in a filmstrip focusing plane. The apparatus includes a first transparent plate located in the path of projected light but spaced to one side of and away from the plane formed by the filmstrip traversing the passageway, a second transparent plate located in the path of projected light but spaced on the opposite side of and away from the filmstrip traversing plane and an assembly operable to separate the first and second plates prior to filmstrip movement through the passageway and also operable for clamping the selected filmstrip portion between the plates in the filmstrip focusing plane after a selected portion of the filmstrip has been moved into and stopped in the path of projected light through the passageway aperture.

A viewer operatively positions the filmstrip separation-clamping assembly in an upper module which is spaced from the base of the viewer. In the space between the module and the base, a filmstrip-driving carriage is movably suspended for translation along tracks on the underside of the module. The cassette is mounted on the carriage for manual translational movement relative to the path of projected light to present a selected column of microimage frames into the path of the projected light and the carriage is adapted to move the filmstrip through the cassette passageway to present a selected row of microimage frames into the path of the projected light.

The separation-clamping assembly cooperates with the first and second transparent plates to present selected microimage frames and includes a slidably-mounted lens plate which normally rests on and clamps the filmstrip between the glass plates in the focusing plane. When it is desired to transport the filmstrip through the cassette passageway, a viewer drive assembly control is activated to energize a solenoid which separates the glass plates and releases the filmstrip for movement therebetween.

In the second, or preferred, form of the invention, the movement of the filmstrip in the cassette is caused to be fast or slow in opposite directions, and controls therefor are provided on the viewer's carriage which carries the cassette. One of the two transparent plates for positioning the desired portion of the filmstrip in the focusing plane is carried by the viewer's carriage, and gravity is relied upon to effect clamping the selected filmstrip portion between the plates in the filmstrip focusing plane. The controls for effecting fast transport of the filmstrip are arranged to cooperate with the carriage-carried transparent to effect separation of the plates simultaneous with initiation of fast transport.

In the module construction for the light-projecting portion of the viewer, the light source, and light intensity enhancing mirror are pre-assembled on a structure that may be selectively removed for servicing of those units, and when pushed back into assembled condition, effects the necessary electrical hook-up with the source of power.

BRIEF DESCRIPTION OF THE DRAWINGS

FIGS. 10–17 illustrate another, and improved, form of viewer and cassette of this invention.

DETAILED DESCRIPTION OF THE INVENTION

Referring now to the drawings, one form of the improved microfilm cassette is shown in FIGS. 1-9 and generally shown as 10, with the improved microfilm viewer generally indicated as 50.

The First Form Of The Invention

The cassette 10 houses a pair of conventional, spaced annular spool means 12, upon which an elongated microimage bearing filmstrip 14 (FIG. 4) is wound. The cassette 10 includes an elongated filmstrip passageway 16 formed by the horizontal path of travel of the filmstrip 14 as it traverses the distance between the spaced spool means 12. A pair of idling rollers 17 are rotatably mounted within the cassette 10. The filmstrip 14 is trained over the idling rollers 17 for selected incremental movement through the elongated filmstrip passageway 16. The path of the filmstrip 14 as it traverses the passageway 16 between the pair of idling rollers 17 defines a filmstrip traversing plane 18 (FIG. 6).

The elongated passageway 16 includes a transverse aperture 20 for permitting projected light to pass through a selected portion of the filmstrip 14 for greatly enlarged and focused display of the microimage that is provided on the selected portion of the filmstrip. First and second generally rectangular transparent, glass plates, 22 and 24 respectively, are disposed within the transverse aperture 20 parallel to each other and filmstrip 14. The upper plate 22 is located in the path of projected light and spaced to one side of and away from the filmstrip 14 in its filmstrip traversing plane 18 while the lower plate 24 is also located in the path of projected light but spaced on the opposite side of and away from the filmstrip 14 in its filmstrip traversing plane 18.

Figures 5, 6, 7, 8, 9:
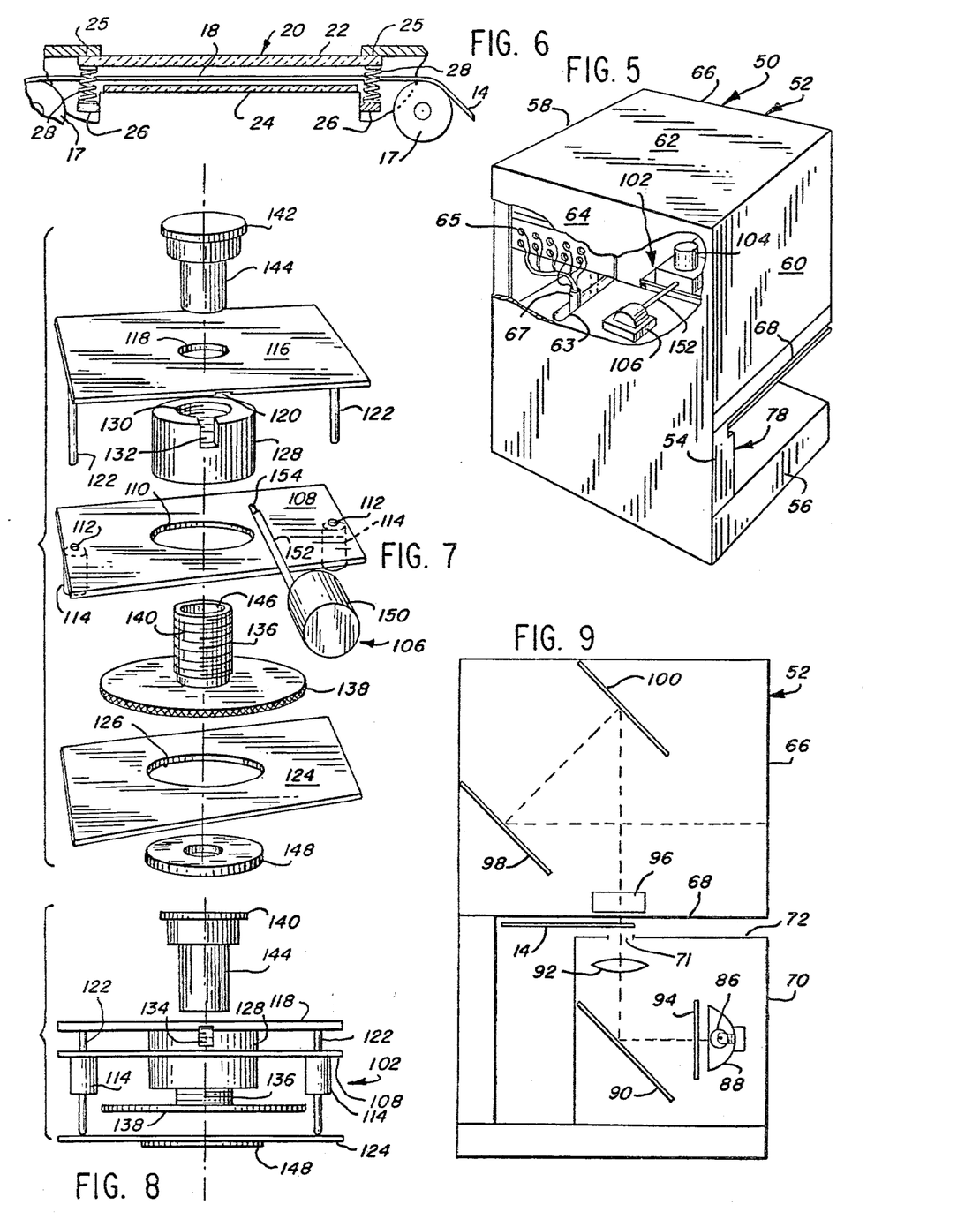
FIG. 5 is a perspective view of the viewer of this invention with the rear thereof partially broken away to illustrate the positioning of the separation-clamping means and the slot through the bottom panel of the module.
FIG. 6 is an enlarged fragmentary front view of the cut-away portion of the bight shown in FIG. 4 and illustrating the relationship of that bight portion to the glass plates.
FIG. 7 is an exploded perspective view of the plate separation-clamping means of this invention.
FIG. 8 is a front elevational view of the assembled plate separation-clamping means of this invention.
FIG. 9 is a side elevational view of the viewer schematically showing the optical system of this invention.

With specific reference to FIG. 6, filmstrip 14 can be seen to be in its filmstrip traversing plane 18 wherein it is disposed parallel to the upper plate 22 and the lower plate 24. The lower plate 24 is fixedly mounted relative to the aperture 20 in the filmstrip passageway 16. The upper plate 22 is of slightly greater width than both the lower plate 24 and the aperture 20 such that the edges 25 of the aperture 20 retain the upper plate 22 within the aperture 20 and limit the upward movement of the upper plate 22. The lower plate 24, being fixedly mounted, limits the downward movement of the upper plate 22. Stop mountings 26 are provided beneath each corner of the upper plate 22 and serve to support upper plate biasing springs 28. The springs 28 normally bias the upper plate 22 into an uppermost position against the edges 25 of the aperture 20. Downward pressure on the upper plate 22 acts against the bias of springs 28 to move the plate 22 downwardly, through the filmstrip traversing plane 18, to clamp the filmstrip 14 against the lower, fixed plate 24 so as to lie in and define a filmstrip focusing plane. When the cassette 10 is placed in operative position in the microfilm viewer 50 and the filmstrip 14 is clamped between upper plate 22 and lower plate 24, the filmstrip 14 thereby lies in the proper focal plane for illumination, enlargement and display on a viewing screen.

In the first embodiment, the cassette 10 is generally U-shaped and includes a pair of leg enclosure means 30 connected by an intermediate bight portion 32. The bight 32 is defined as that portion of the cassette between the leg means 30 in which the filmstrip 14 is trained over idler rollers 17 to locate the filmstrip traversing plane 18. The front and back sides, 34 and 36, of the enclosure means 30 rotatably support the spool means 12 for winding the filmstrip 14 thereon and rotatably support the idler rollers 17 for training the filmstrip 14 thereover. Since the cassette 10 of the present invention does not grip the longitudinal filmstrip edges, the idler rollers 17 must be at least as wide as the filmstrip being used to support the filmstrip 14 in its traversing plane 18.

The Viewer

The microfilm viewer 50 of this invention comprises several major components, each of which is being described in detail below.

The Module

The viewer 50 includes an upper module 52. The module 52 is spaced by vertical support means 54 from a viewer supporting base 56. The module 52 is enclosed by side panels 58 and 60, top panel 62, back panel 64 and a substantially transparent microimage display and viewing screen 66. The precise configuration of the respective panels is not critical, but in the preferred embodiment they form a generally rectangular container. The bottom panel 68 of the module 52 includes a light ray window (not shown) formed by cutting away a portion of the bottom panel 68. The bottom panel 68 also has a pair of spaced, parallel, carriage-mounting tracks (not shown) constructed thereon and extending along at least part of the depth of the module between the viewing screen 66 and the back panel 64.

The bottom panel 68 of the module 52 has an elongated slot 63 extending therethrough. An electrical control panel 65 is housed adjacent the back panel 64. Wires from the control panel 65 are bound together to form an "umbilical cord" 67 passing from the module 52 to a cassette carriage 74 for reasons explained below.

The Enclosure

Centrally located in the space between the module 52 and the base 56 and resting on the base 56 in a filmstrip illuminating enclosure 70 having a light passing opening 71 formed in its upper surface 72, directly below and aligned with the light ray window in the bottom panel 68 of the module 52. The height of the enclosure 70 is less than the height of the space between the base 56 and module 52.

The Carriage

A cassette-driving and translating carriage 74 includes an upper, generally horizontally-disposed frame 76 and filmstrip driving casing 78. The casing 78 is generally rectangular in shape and depends from one side of the horizontal frame 76. A pair of elongated filmstrip-winding spindles 80 extend outwardly from the front side of the casing 78 on opposite sides of the enclosure 70 and are arranged to slidably enter the bores of the annular spools 12 and to effect driving connection therewith through the medium of one-way sprag clutches not shown, but well known in the art, carried by spools 12. Secured to the side of the horizontal frame 76 opposite the casing 78, a pair of elongated runners (not shown) are spaced so as to engage the track on the underside of the bottom panel 68 and support the carriage 74 for translational movement relative to the viewer module 52 and the enclosure 70.

The carriage 74 translates between a first rearward position in which the frame 76 extends only slightly forwardly of the plane of the viewing screen 66 and a second forward portion in which the frame 76 extends substantially forwardly of the plane of the viewing screen 66. The actual length of travel of the carriage 74 on the tracks is not critical, but the travel must be at least as long as the width of the filmstrip wound in the cassette 10 so that the entire width of the filmstrip can pass over the opening 71 in the filmstrip illuminating enclosure 70 for projection onto the viewing screen 66. In this regard, the length of the slot 63 through the bottom module panel 68, must also be of sufficient length to allow the carriage 74 to traverse the length of the tracks.

The motors and gearing housed within the casing 78 are not picture because the drive system used to longitudinally move the filmstrip 14 of the present invention closely approximates the motors and gearing fully illustrated and explained in U.S. Pat. No. 3,785,728. It should be understood that variations and modifications of the drive mechanism may be made without departing from the spirit and scope of this invention. The drive system is controlled by the umbilical cord 67 extending from the control panel 65 through the slot 63 and attached to the motors housed within carriage 74.

A variable speed control 82 is positioned at the center and front of the horizontal frame 76 and extends forwardly thereof. By displacing the control to the right, the right-hand spindle 80 is rotated to rotate the spool 12 in the filmstrip cassette 10 and thereby move the filmstrip 14 to the right, whereas displacement of the control 82 to the left similarly effects filmstrip displacement in the left-hand direction. The control 82 is connected to a rheostat for varying the speed of spindle rotation. The further to the right or to the left the control 82 is shifted from its normal inoperative, centrally located position, the greater is the speed of spindle rotation in that direction.

A centrally elongated, transversely and longitudinally extending cut-out (not shown) is located on the frame 76 so as to be aligned with the opening 71 in the top surface 72 of the enclosure 70 when the carriage 74 translates along the module tracks. The frame 76 further includes a pair of handles 84 on opposite sides of the speed control 82 for use in manually moving the carriage 74 relative to the module 52 and enclosure 70. A lock 84 may be provided on the frame 76 to fasten the carriage 74 in its rearward position when not being used so as to prevent cassette theft and unauthorized viewer manipulation.

The Optical System

Viewing FIG. 9, the optical system of this invention will now be described. The enclosure 70 includes a source of illumination such as light 86 behind which a curved reflector 88 directs the light rays emanating from the source of light 86 to impinge on a dichroic folding mirror 90 which filters out infrared rays and directs the light rays upwardly through a condensing lens 92 and through the openings 71 in the upper enclosure surface 72. A heat absorbing filter 94 as well as other heat venting means, may be included within the enclosure 70 to relieve the temperature build-up in the confines of the enclosure 70.

Because the height of the enclosure 70 does not extend upwardly far enough to reach the module 52, a filmstrip 14 may be positioned between the opening 71 in the upper surface 72 of the enclosure 70 and the cut-out in the horizontal carriage frame 76. The projected light rays then pass through the selected portion of the filmstrip trained over the enclosure 70 and enter the module 52 via the light ray window formed in the bottom module panel 68.

The image bearing light rays pass through an objective projecting lens 96 and are directed from a first folding mirror 98 to a second folding mirror 100 to the viewing screen 66 for display. It is to be understood that variations in the size and attitude of the viewing screen and the orientation of the folding mirrors can be made without departing from the scope of the invention. It is however, significant that the optical system is fixed within the viewer 50 and that it is the filmstrip that moves relative to the fixed optical system.

The Separation-Clamping Means

Separation-clamping means 102 provided on the bottom panel 68 of the viewer module 52 are operable to move the filmstrip 14 through the filmstrip passageway means 16 for effecting separation of the upper and lower transparent plates 22 and 24. The separation-clamping means 102 are further operable after a selected portion of the filmstrip 14 has been moved into and stopped in the path of the projected light emanating from the enclosure 70, for clamping the selected filmstrip portion between the upper and lower plates, 22 and 24, in the filmstrip focusing plane.

The separation-clamping means 102 comprises lens assembly means 104 and plate separation means 106.

The Lens Assembly

The lens assembly means 104 includes generally rectangular plate means 108 for attaching the lens assembly means 104 to the module 52 so as to be positioned directly above the upper transparent glass plate 22 in the cassette aperture 20 and the light passing opening 71 in the upper surface 72 of the enclosure 70. The attachment plate 108 includes a large centrally positioned aperture 110 and a pair of smaller apertures 112 adjacent opposite side edges thereof. A pair of stop sleeves 114 depend from the underside of the attachment plate 108 with the bore of the stop sleeves 114 aligned beneath the small apertures 112.

An upper generally rectangular lens plate 116 includes a centrally positioned aperture 118, an eccentric receiving notch 120 on the underside thereof and a pair of rods 122 secured at one of their ends to and depending from the opposite side edges of the upper lens plate 116. The diameter and location of the rods 122 are such that they may be slidably received in apertures 112 and the central bore stop sleeves 114.

A lower, generally rectangular lens plate 124 also includes a centrally positioned aperture 126 and secures the other ends of rods 122 at its opposite side edges. When the attachment plate 108 is securely mounted in the bottom of upper module 52 of the viewer 50, the upper and lower lens plates 116 and 124 are movable en masse as the rods 122 reciprocally slide in the apertures 112. When so mounted, the apertures 110, 118 and 126 are positioned in vertical alignment with each other and with the light passing opening 71 in the upper surface 72 of the enclosure 70, the aperture 20 in the cassette 10 and the light ray window in the bottom panel 68 of the viewer module 52. The downward motion of the lens plates 116 and 124 is limited by the bottom surface of the stop sleeves 114.

An elongated lens-sleeve-receiving-casing 128 is secured to the underside of the upper lens plate 116 for movement therewith. The outer diameter of the lens casing 128 is smaller than the diameter of the attachment plate aperture 110 so that the lens casing 128 is free to slide through the aperture 110 as the upper and lower plates 116 and 124 reciprocate. The lens casing 116 includes a centrally threaded bore 130 therethrough and a notch 132 at its upper plate contacting edge. When the lens casing 128 is secured to depend below the upper plate aperture 118, the lens casing notch 132 and the upper plate notch 120 define an eccentric-receiving opening 134.

An elongated lens sleeve 136 has at its lower end an enlarged-knurled flange 138. The lens sleeve 136 is externally threaded at 140 for reception in the internally threaded bore of the lens casing 128. The knurled flange 138 has a diameter greater than the diameter of the attachment plate aperture 110 so that the lens sleeve 136 must be inserted into the lens casing 128 from below the lens attachment plate 108. Even when so inserted, the lens sleeve 136 is reciprocally movable with the lens casing 128. A projection lens 142 is mounted on lens insertion means 144 to be held within the bore 146 of the lens sleeve 136 is any desirable manner.

A polycarbonate ring 148 may be secured on the bottom side of the lower lens plate 124. The ring 148, being fabricated from a soft, resilient material, will not scratch or otherwise injure a surface with which it makes contact.

Although not shown, an oil stone bearing washer may be inserted in the eccentric-receiving notch 120 formed on the underside of upper lens plate 116. The purpose of the oil stone washer is to soften the sound of impact of the eccentric as it contacts the upper plate 116.

The Separation Means

The separation means 106 includes a solenoid 150, an eccentric shaft 152 and an eccentric 154 at the end of the shaft 152. The shaft 152 is rotatably secured at one end to the solenoid 150. The opposite end of the shaft 152 is placed within the eccentric-receiving opening 134 formed by the lens casing 128 and the upper lens plate 116. The solenoid 150 is then fastened to the bottom of the viewer module 52, whereby activation of the solenoid 150 rotates the eccentric 154 within the eccentric opening 134 such that it strikes the upper plate notch 120, causing the upper and lower lens plates 116 and 124 and parts mounted thereon to slide upwardly from their normal downwardly, gravity-biased position.

Operation

The operation of the microfilm viewing system of the present invention will now be described. The cassette 10 is snapped onto the carriage 74, in the space between the upper viewer module 52 and the viewer base 56, such that the carriage drive spindles 80 engage the cassette spools 12 for rotation thereof. In the preferred embodiment, the cassette 10 is generally U-shaped and the spool enclosure leg means 30 are positioned on opposite sides of the enclosure 70. The window 20 in the bight portion 32 which includes upper and lower glass plates 22 and 24 is positioned to be directly aligned with the opening 71 in the top surface 72 of the enclosure 70, the cut-away portion of the carriage frame 76, the slot in the bottom module panel 68 and the apertures 124, 110, 118, in the lens plates 124, 108 and 116. In this manner an optical light path is formed from the enclosure 70, through the opening, the cassette window 20, the carriage frame 74, the bottom module plate 68 and into the objective projection lens 142.

In the normal, unactivated position of the glass plate separation-clamping means 102, the weight of the lens plates 118 and 124, the lens sleeve 136 and the lens casing 128, acting under the influence of gravity, slides the separation-clamping means 102 downwardly. In this downward position, the polycarbonate ring 148 rests on and depresses the upper glass plate 22 against the bias of the springs 28 to move the filmstrip 14 from the filmstrip traversing plane 18 to the filmstrip focusing plane in which the filmstrip 14 is clamped between the upper and lower glass plates 22 and 24 at the focal point of the projection lens 142. In this position the carriage 74 may be translated along the tracks to select a microimage frame from a column of frames printed on the filmstrip width.

When it is desired to move the filmstrip 14 longitudinally the control 82 is pushed in the right or left-hand direction to correspondingly move the filmstrip 14. The further to the right or left the control 82 is shifted, the greater is the speed of spindle rotation. The solenoid 150 is energized simultaneously with activation of the control 82. Energization of the solenoid 150 rotates the eccentric 154 at the end of eccentric shaft 152 within eccentric opening 134 to contact the bottom of the upper lens plate 116 and thereby lift the glass plate separation-clamping means 102 upwardly. As the separation-clamping means 102 moves upward, the upper glass plate 22 is also allowed to move upwardly under the bias of the spring 28. This serves to release the filmstrip 14 for longitudinal movement through the transverse passageway aperture 20 in the filmstrip traversing plane 18 to present a selected row of microimage frames in the aperture 20.

It is thus seen that the use of the control 82 and the traversing carriage 74, presents a selected microimage frame from any filmstrip row or column into the path of projected light for illumination, enlargement and display on the viewing screen 66.

THE SECOND FORM OF THE INVENTION

In the description of the preferred embodiment of the invention which follows, elements substantially identical to those elements described in the First Form Of The Invention, are given like reference numerals with a prime (') added.

Referring now to the drawings, major elements of the second form are shown generally in FIGS. 10-17 in which the microfilmstrip cassette is depicted generally at 10' and the microfilmstrip viewer is generally indicated at 50'.

The Cassette

The cassette 10' is generally U-shaped, the legs of the U being formed by a pair of box-like enclosures 30' between which extends the U's bight that includes cross bars 11 and provide support for a transparent glass plate 22' carried by the cassette 10'. The oppositely facing side walls of the two enclosures are apertured to provide passageways 16, above the plate 22', through which the filmstrip 14' passes from one to the other of the enclosures 30'. The filmstrip 14' is moved from a pair of spool means 12' trained over spaced idling rollers 17, FIG. 4, located within the enclosures 30'. The idling rollers 17 operate to define a filmstrip traversing plane as the path the filmstrip 14' moves through in passing between the enclosures 30', the path being spaced above of and not contacting the upper surface of the transparent plate 22'.

The presence of the transparent plate 22' supported only at its ends in the bight portion of the cassette 10' provides a transverse aperture means 20' for permitting projected light to pass through the plate 22' and a selected portion of the filmstrip 14'. The plate 22' is fixed by the cassette 10' at an attitude parallel to, but below the horizontal path of travel of the filmstrip 14' when in its filmstrip traversing plane. More specifically, the transparent plate is arranged to lie, at each end, in a recess and on a shoulder 15 defined in the cross bar 11.

Figure 15:
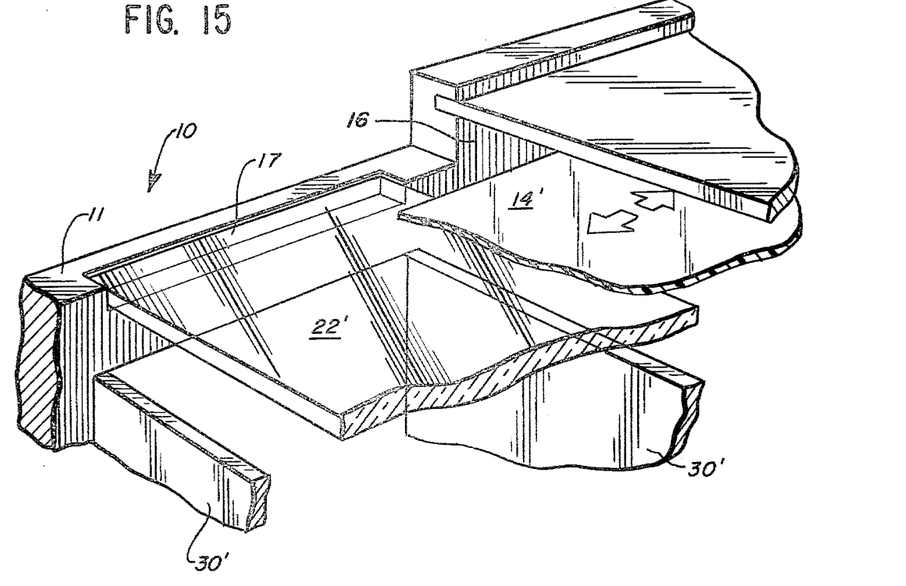
FIG. 15 is a greatly enlarged, fragmentary and broken away, perspective view of a portion of the cassette, showing the transparent plate carried by the cassette, and the filmstrip passing thereover.
Figure 16:
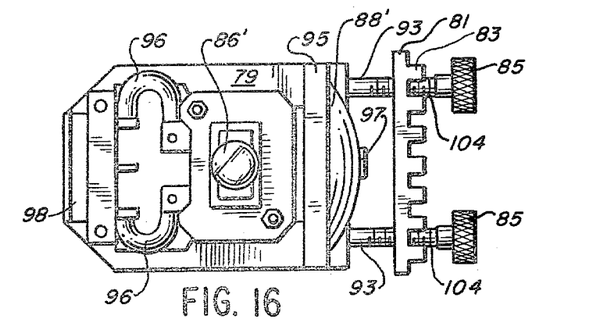
FIG. 16 is a top plan view showing the removable projection and illumination cartridge of the viewer.
Figure 17:
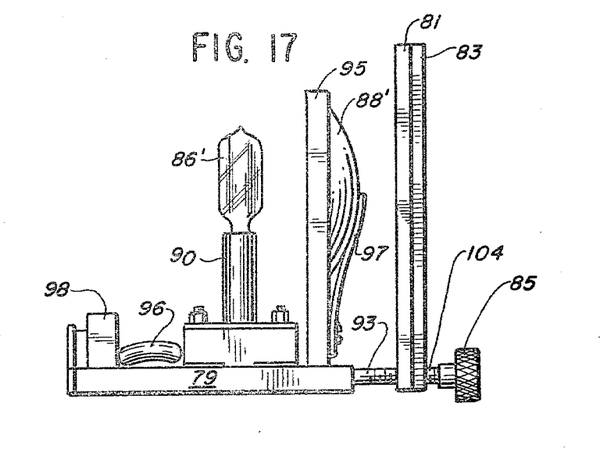
FIG. 17 is a side elevational view of the cartridge shown in FIG. 16.

Referring to FIG. 15, the filmstrip 14' is shown in the filmstrip traversing plane wherein it is disposed parallel to, but spaced above the plate 22'. There is sufficient "give" in the coiled portions of the filmstrip located in the enclosure 30' to permit the filmstrip 14' to be moved downwardly until its bottom surface 14' engages the top surface of the plate 22'. With the cassette 10' operatively positioned in the viewer 50' and the filmstrip 14' engaging the transparent plate 22', the filmstrip 14' lies in the proper focal plane for illumination, projection and display on the viewer's viewing screen.

The Viewer

The major components of the microfilm viewer 50' are described in detail below.

The Enlarging And Viewing Module

The viewer 50' includes an upper enlarging and viewing module 52' being spaced by upright support sides 54' above a viewer support base 56'. The module 52' is enclosed by side panels 58' and 60', top panel 62', back panel 64', a translucent microimage display and viewing screen 66', and a bottom panel 68'.

The bottom panel 68' of the module 52' includes a light projection window (not shown) formed by cutting away a portion of that panel. The bottom panel also has a pair of spaced, parallel, carriage-mounting tracks (not shown) constructed thereon and extending along at least part of the depth of the module between the viewing screen 66' and the back panel 64'.

The bottom panel 68' of the module 52' further has an elongated slot 63, see FIG. 5, extending therethrough. Electrical controls are housed adjacent the back panel 64' and wires from the electrical controls are bound together to form an "umbilical cord" 67 and pass from the module 52' to a cassette carriage 74'.

The Light Projecting Enclosure

Figures 1, 3:
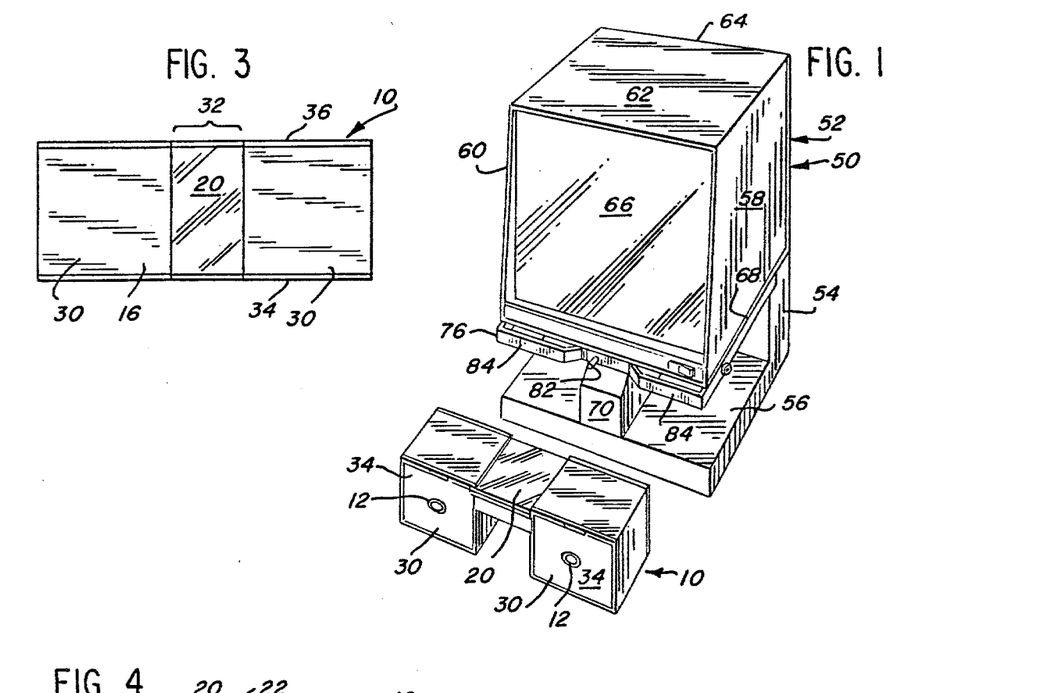
FIG. 1 is an exploded perspective view of the viewer and cassette of this invention.
FIG. 3 is a top plan view of the cassette of FIG. 1 showing the transparent aperture in the bight portion thereof.

Centrally located in the space defined vertically between the module 52' and the base 56', and mounted on the base 56' is a light projecting enclosure 70', see FIG. 1, having a light passing opening 71' formed in its upper wall 72', directly below and aligned with the light ray window in the bottom panel 68' of the module 52'. The height of the enclosure 70' is less than the height of the space between the base 56' and the module 52'.

The enclosure 70' further includes side walls, 73 and 75, rear wall 77, base plate 79 and front wall 81. The walls may be provided with elongated ribs such as 83, FIGS. 16 and 17, on their exterior surface from which to dissipate heat generated within the enclosure 70'. The front wall 81 is secured to the base plate 79 by a pair of screws 104 having enlarged, knurled heads 85. The heads 85 may be rotated to firmly engage a pair of spaced, tubular extensions 93 of base plate 79. A tight connection is important to insure proper conduction and dissipation of heat from the front wall 81. Mounted on the base plate 79 is a light socket 90 which receives a high intensity light bulb 86'. Light rays from the bulb 86' are reflected by a concave mirror 88' that is held in position on an upright, base-mounted frame 95, by means of a leaf spring 97. The light socket 90 receives power via wires 96 which connect to an electrical power-receiving, socketed receptacle 98. The socketed receptacle 98 is adapted to receive power-transmitting prongs secured within the enclosure 70'.

The front wall 81 and base plate 79, with the illumination and projection elements mounted thereon, constitute a cartridge that is selectively removable from the remainder of the enclosure 70'. Because the light projection means are removable as a cartridge, the illumination and projection elements may be replaced, or adjusted for alignment, by simply removing the cartridge to a convenient location for work thereon. Upon re-insertion of the sub-assembly, the socketed receptacle 98 receives the electrical male power prongs to energize the light bulb 86'.

The Carriage

The carriage 74' includes an upper, generally horizontally disposed tray 76' and a drive casing 78' depending from the rear portion of the upper tray 76'. A pair of elongated filmstrip winding spindles 80' extend forwardly from the front wall of the carriage drive casing 76' and on opposite sides of the projection enclosure 70' and are shaped to slidably enter the bores of the annular spools 12' and to effect driving connection therewith through the medium of one-way spring clutches. Also secured to the front wall of the drive casing 76' above and below each spindle 80', are a pair of elongated stop means 105 that are to be abutted by the cassette 10' to properly position the cassette 10' on the carriage 74'. Secured to the top side 130 of the tray 76' are a pair of elongated track gripping members 102, spaced so as to engage the track on the underside of the bottom panel 68' and to thereby support the carriage 74' for back and forth translational movement relative to the viewer module 52' and projection enclosure 70'.

Figure 10:
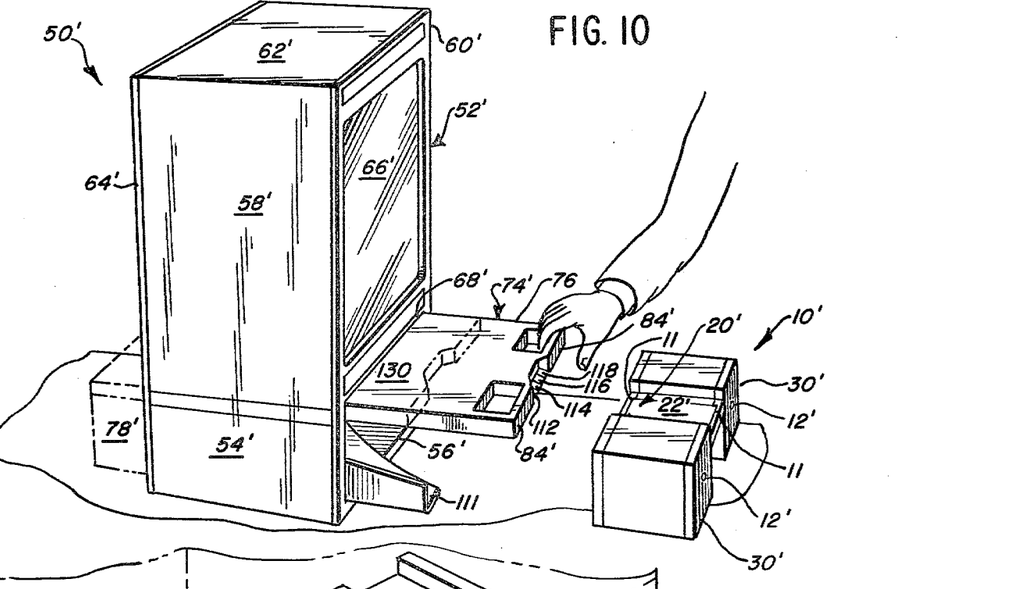
FIG. 10 is an exploded perspective view showing the cassette for the microfilmstrip separated from the carriage therefor, and showing in solid lines the carriage drawn into its forward position, and by phantom lines the carriage in its rearward position.
Figure 11:
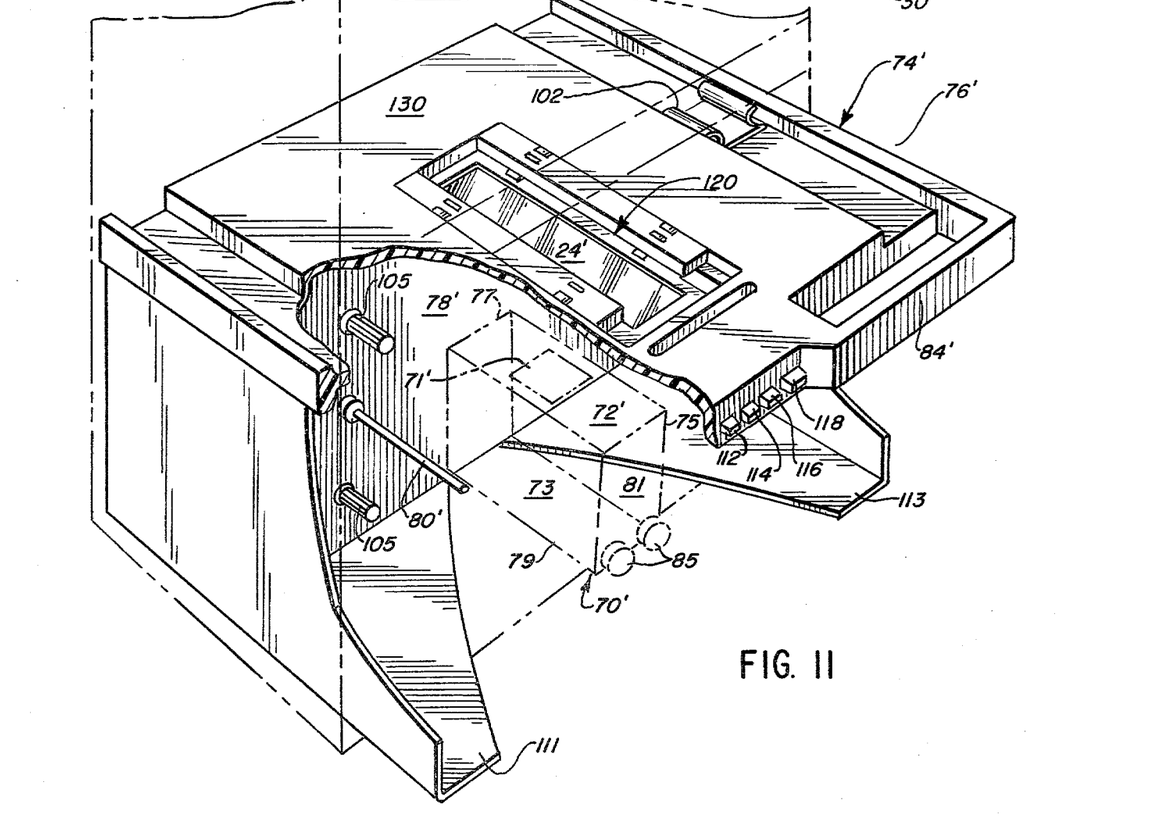
FIG. 11 is a fragmentary and broken away enlarged perspective view showing some of the features of the carriage, including the manual controls for selecting speed and direction of movement of the filmstrip, the drive spindles on the viewer, the movable transparent plate on the carriage, and showing in phantom lines the light projecting module.

The carriage 74' translates between a first, rearward, position shown in broken lines in FIG. 10, in which the drive casing 78' extends rearwardly of the plane of the back panel 64', and a second, forward, position, shown in full lines in FIG. 10, in which the drive casing 78' lies substantially flush with the plane of the back panel 64'. The actual length of travel of the carriage 74' on the tracks is not critical, but the forward-rearward travel must be at least as great as the width of the filmstrip in the cassette 10', so that the entire width of the filmstrip can be exposed to the light projection opening 71'.

Four control buttons, 112, 114, 116 and 118, are positioned at the front center of the horizontal tray 76' and project forwardly thereof. The control buttons are adapted to be manually depressed against a restoring spring bias for controlling the speed and direction of spindle rotation. The laterally outermost buttons, 112 and 118, preferably control fast filmstrip winding in opposite directions, while the inner buttons, 114 and 116, control slow filmstrip winding in opposite directions. A rheostat control interposed in the circuits, controlled by the manual controls, may be used to vary the speeds of spindle rotation.

A generally centrally located, elongated cut-out 120 is located through the tray 76'. It is sized and positioned to receive a transparent upper plate 24' that will cooperate with the transparent plate 22' on the cassette 10', as described hereinafter. The carriage 74' is shaped to include a pair of handles 84' located on opposite sides of the speed controls 112, 114, 116 and 118, for use in manually moving the carriage 74' forwardly and backwardly. And the bottom and sides of the carriage 74' may be partially enclosed by thin sheets, such as 111 and 113 to help support the weight of the cassette 10'.

Referring particularly to FIGS. 11–14, the upper plate 24' and its movement will now be described. Adjacent each of the longitudinal edges of the cut-out 120 are a pair of spaced bores 124 in which upper pivot pins 126 are horizontally positioned. A link-receiving slot 128 is formed through the depth of the tray 74' in association with each horizontally-positioned pin 126. Another slot 130 is defined exteriorly of each first slot 128 to receive a retaining washer 132 which secures one of the pivot pins 126 in position. A flat, elongated link 134 pivots at one end thereof on pin 126 within slot 128.

Figure 13:
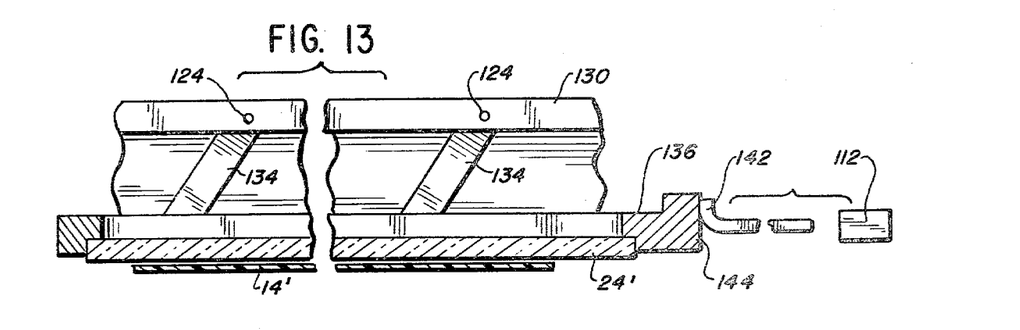
FIG. 13 is a cross-sectional view taken substantially along line 13—13 of FIG. 12, showing in side elevation the linkages between the carriage and the movable transparent glass plate, and illustrating the speed control and push bar for selectively raising the movable transparent plate.
Figure 14:
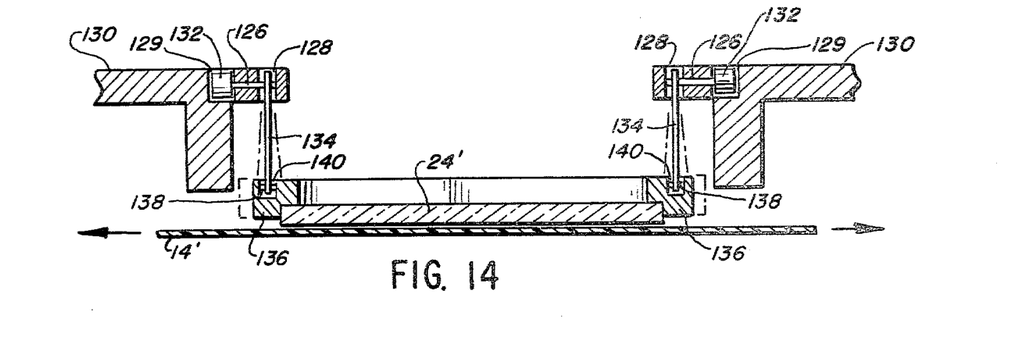
FIG. 14 is a cross-sectional view taken substantially along line 14—14 of FIG. 12, and illustrating details of the arrangement of the link means between the viewer's carriage and the movable transparent plate, and illustrating the range of lateral movement of the transparent plate under force transmitted thereto from the moving filmstrip.

A generally rectangularly-shaped frame 136 is provided with spaced bores (not shown) into which lower pivot pins 138 are horizontally positioned. A link-receiving slot 140 is formed in the support frame 136 in association with each horizontally-positioned pin 138. The other end of each link 134 is pivotally connected to the lower pivot pin 138 on frame 136, to thereby provide parallelogram-type linkages between carriage 74' and frame 136. Secured to the plate support frame 136 and extending therebelow, as seen in FIGS. 13 and 14, is the transparent glass plate 24' which has a length greater than the width of the filmstrip 14'.

Figures 2, 4:
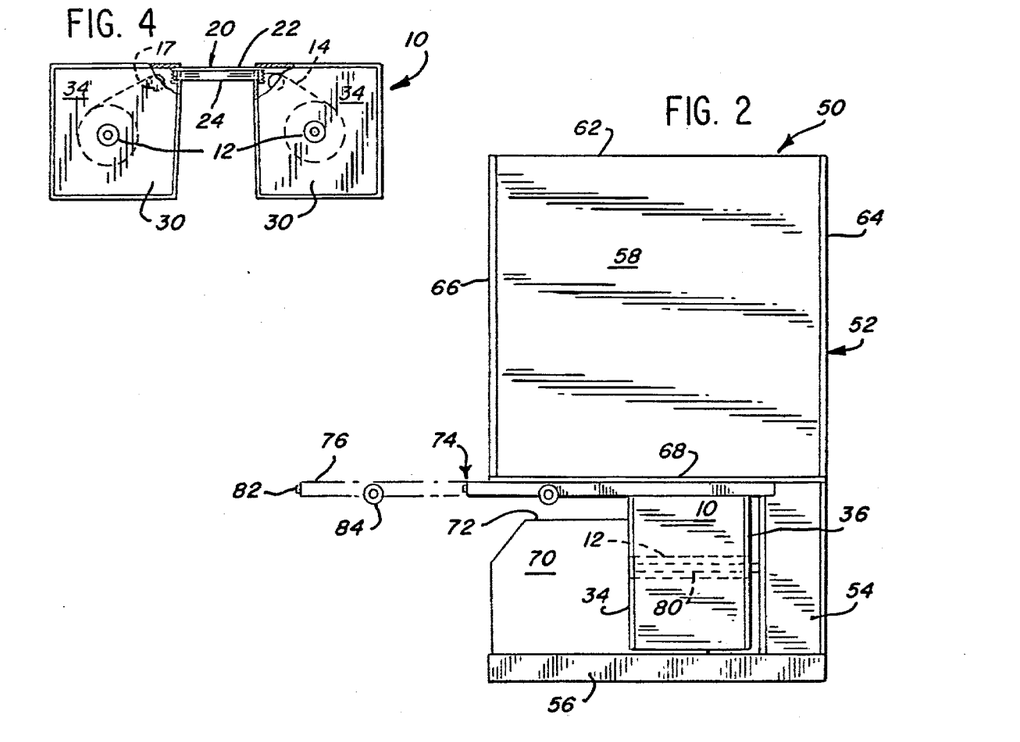
FIG. 2 is a side elevational view of the viewer of FIG. 1 showing: (1) the movable carriage in its innermost position in solid lines, and (2) the carriage in its outermost position in phantom lines.
FIG. 4 is a front elevational view of the cassette of FIG. 1 with a portion of the bight cut-away to show the upper and lower glass plates across the aperture in the bight portion.

Gravity acting on the weight of the plate support frame 136 and transparent plate 24' operates to normally bias and move the frame 136 and plate 24' downwardly. The length of the links 134 is such that when the plate 24' is in its lowered position engaging filmstrip 14' and pressing it against transparent plate 22' of the cassette 10', the links 134 are still inclined, as seen in FIG. 4, thereby insuring that the filmstrip 14' is pressed with force against plate 22'. Since the top surface of the transparent plate 22' on cassette 10' lies in the focal plane of projection, the filmstrip 14' is normally maintained in said focal plane by the force of gravity acting on plate 24'.

An elongated, frame-elevating bar 142 extends between each of the high-speed control buttons 112 and 118 and the forward transverse edge 144 of the plate support frame 136. Inward depression of either of said high-speed control buttons, 112, or 118, mechanically moves the corresponding bar 142 inwardly against plate support frame 136 to move frame 136 and transparent plate 24' to swing upwardly about pivot pins 126. The filmstrip 14' is now released and may move longitudinally between the spools 12' of the cassette 10' without frictional drag or resistance from the movable plate 24' or from plate 22'. Since no bar extends to the low-speed control buttons, 114 and 116, the movable plate 24' remains in filmstrip engagement when the low-speed buttons, 114 and 116, are depressed to provide relatively low-speed, or inching, longitudinal movement of the filmstrip 14, as indicated by the direction arrows in FIG. 12.

Figure 12:
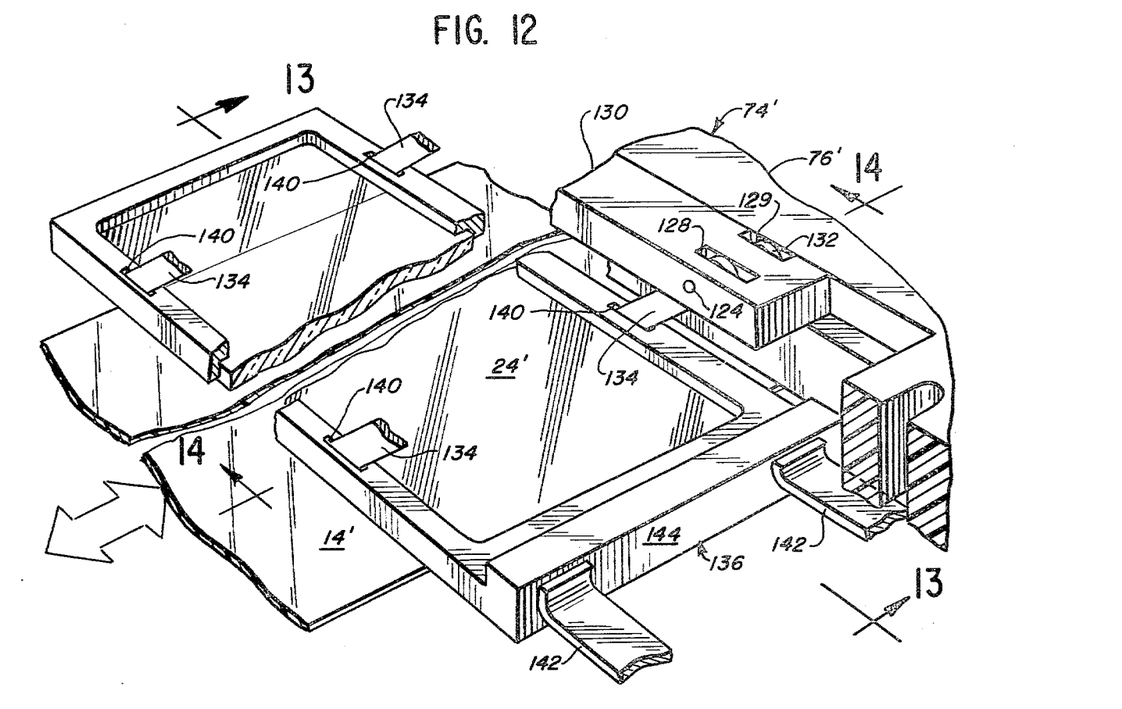
FIG. 12 is a further enlarged perspective view of the movable transparent plate portion of the carriage, and illustrating the push bars for selectively raising said movable transparent plate.

Viewing FIG. 12, it will be seen that the width dimension of each of the upper and lower link-receiving slots, 128 and 140, is substantially greater than the width dimension of the links 134 received therein. Because of such clearance, the plate support frame 136, and its plate 24', are permitted to move laterally and slightly upwardly from the nadir point of the virtual pendulum illustrated in FIG. 14 from the full line position to the phantom line position. This slight upward movement of plate 24' provides sufficient relief to permit inching movement of filmstrip 14' without injury to the filmstrip.

With the high-speed and slow-speed controls described above, it will be understood that a high-speed control button, 112 or 118, is first depressed to energize a motor means for moving filmstrip 14 at high speed along the rows of microimages to approximate location of the micoimage frame desired to be viewed. The carriage may then be manually pulled out or pushed parallel to the columns of microimages on the filmstrip 14'. Then the appropriate low-speed control button, 114 or 116, is activated to inch the microphotograph into alignment for illumination and display on the viewing screen 66'.

The Optical System

The optical system for this second form of the invention is substantially identical with the optical system shown in FIG. 9 and described in connection with the first embodiment.

Referring to FIG. 9, the system includes a light bulb 86' from which light rays emanate and are directed to the concave mirror 88' which reflects the rays to a reflecting mirror 90 and through a condensing lens 92, the cassette's transparent plate 22', the filmstrip 14', the carriage's transparent plate 24' and into the upper viewing module 52'.

In the upper module 52', the light rays pass through an objective projecting lens 96 and are directed from a first folding mirror 98 to a second folding mirror 100 to the viewing screen 66' for display. It is to be understood that variations in the size and attitude of the viewing screen and the orientation of the mirrors that fold the optical path can be made without departing from the scope of the invention.

Operation

The operation of the microfilmstrip viewing system of the present invention will now be described. The cassette 10' is fitted into place on the carriage 24' in the space between the upper viewer module 52' and the viewer base 56', such that the drive spindles 80' enter the central bores of the cassette spools 12' for driving engagement thereof. The transparent cassette plate 22' presents an upper surface above which the filmstrip 14' passes. The movable, transparent carriage plate 24' is normally biased to clamp filmstrip 14' against the upper surface of plate 22' which defines the focal plane for projection of an illuminated image from the microfilmstrip. The carriage 74' may be manually translated along the tracks provided to select a microimage from the column of frames imprinted along the width of the filmstrip 14'.

When it is desired to move the filmstrip longitudinally along the rows of frames imprinted on the filmstrip, one of the fast-speed control buttons, 112 or 118, is first manually depressed. Depression of one of the fast buttons simultaneously causes a bar 142 to pivot the plate support frame 136 upwardly out of filmstrip contact, and energizes motor means to drive the spindle 80' to move the filmstrip 14' longitudinally in the selected direction. The fast-speed buttons are used to quickly bring a desired filmstrip microimage frame approximately into view. Once the location is approximated, depressing one of the slow-speed control buttons, 114 of 116, operates to energize a motor means to effect inching of the filmstrip 14' to effect "fine-tuning control", to move the filmstrip 14' to bring the desired image into view. The slow-speed filmstrip movement does not fully release the filmstrip 14' from engagement by transparent carriage plate 24', but play in the linkage permits some small lifting of plate 24' which avoids injury to the filmstrip during movement.

The use of the speed control buttons, 112, 114, 116 and 118, and the translatable carriage 74' is thus able to present a selected microimage frame from any filmstrip row or column into the path of projected light for illumination, enlargement and display on the viewing screen 66'.

While one form of the invention has been described, it will be understood that the invention may be utilized in other forms and environments, so that the purpose of the appended claims is to cover all such forms of devices not disclosed but which embody the invention disclosed herein.

What is claimed is:

1. For use with a cassette that houses spaced spool means upon which portions of an elongated microimage-bearing filmstrip are wound, the cassette including an elongated filmstrip passageway means through which the filmstrip may be longitudinally moved in selected incremental amounts from one of the spool means to another of the spool means, the movement of the filmstrip in the passageway means defining a filmstrip traversing plane, and the elongated filmstrip passageway means including a transverse aperture for permitting a projected light to pass through a selected portion of the filmstrip for greatly enlarged and focused display of the microimage that is provided on the selected portion of the filmstrip, the improvement comprising, in combination:

a first transparent plate located in the path of the projected light and spaced to one side of and away from the filmstrip traversing plane;

a second transparent plate located in the path of the projected light and spaced on the opposite side of and away from the filmstrip traversing plane;

the first and second transparent plates having a normal condition, when the filmstrip is not being moved, which permits opposite sides of the selected portion of the filmstrip to be moved out of said filmstrip traversing plane and to be engaged by both transparent plates so as to position said selected portion of the filmstrip in a desired focal plane that is spaced from said filmstrip traversing plane;

first and second means for respectively causing the filmstrip to move longitudinally at relatively high speed and relatively low speed; and means operative to move one of the plates away from said normal, filmstrip-engaging, condition when the filmstrip is moved at its relatively high speed to permit the filmstrip to then move into the filmstrip traversing plane spaced from both transparent plates.

2. A construction as in claim 1 wherein the first transparent plate is carried by the cassette and the second transparent plate and the plate movement means are operatively positioned exteriorly thereof.

3. A construction as in claim 1 wherein the filmstrip is maintained substantially in the desired focal plane when the filmstrip is moved at its relatively low speed, so that a viewer may visually monitor the incremental movement of the filmstrip.

4. A construction as in claim 2 wherein the plate carried by the cassette is located below the movable plate, the movable plate being biased downwardly by gravity to normally engage the filmstrip positioned between the plates.

5. In a cassette that houses spaced spool means upon which portions of an elongated micro-imagebearing filmstrip are wound, the cassette including an elongated filmstrip passageway means through which the filmstrip may be longitudinally moved in selected incremental amounts from one of the spool means to another of the spool means, the movement of the filmstrip in the passageway means defining a filmstrip traversing plane, and the elongated film passageway means including transverse light transmitting portions for permitting a projected light to pass through a selected portion of the filmstrip for greatly enlarged and focused display of the microimage that is provided on the selected portion of the filmstrip, the improvement comprising, in combination:

a first transparent plate carried by the cassette and located in the path of the projected light, said plate being fixed relative to the filmstrip traversing plane and spaced from said filmstrip traversing plane, the filmstrip being selectively movable longitudinally through the filmstrip passageway means without contacting the fixed transparent plate, and the cassette being constructed to provide an opening therein located so that the opposite sides of a selected portion of the filmstrip respectively face said transparent plate and said opening, the said opening being of a size and shape to permit the selected portion of the filmstrip to be exposed to being engaged by a transparent plate that is positionable exterior of the cassette and is adapted to be selectively moved against said selected portion of the filmstrip and to move same away from the filmstrip traversing plane to a position against said first transparent plate when it is desired to project and read the microimage thereon.

6. In the combination of a cassette that houses spaced spool means upon which portions of an elongated microimage-bearing filmstrip are wound, the cassette including an elongated filmstrip passageway means through which the filmstrip may be longitudinally moved in selected incremental amounts from one of the spool means to another of said spool means, the movement of the filmstrip in the passageway means defining a filmstrip traversing plane, and the elongated film passageway means including transverse light transmitting portions for permitting a projected light to pass therethrough; and a viewer for projecting light through a selected portion of the filmstrip in the cassette for greatly enlarged and focused display of the microimage that is provided on the selected portion of the filmstrip; the improvement comprising in combination:

a first transparent plate located in the path of the projected light and spaced to one side of and away from the filmstrip traversing plane;

a second transparent plate located in the path of the projected light and spaced on the opposite side of and away from the filmstrip traversing plane;

the first and second transparent plates having a normal condition, when the filmstrip is not being moved, of engaging opposite sides of the selected portion of the filmstrip so as to move said selected portion of the filmstrip into a desired focal plane that is spaced from said filmstrip traversing plane;

first and second means for respectively causing the filmstrip to move longitudinally at relatively high speed and relatively low speed; and means operative to move one of the plates away from the normal, filmstrip-engaging condition when the filmstrip is moved at the relatively high speed, and to maintain the plates substantially in the normal, filmstrip-engaging condition when the filmstrip is moved at the relatively low speed.

7. A combination as in claim 6 wherein the first transparent plate is carried by the cassette adjacent the film passageway means and the second transparent plate is movably mounted relative to the fixed plate for movement from its position in the normal condition away from its filmstrip-engaging plane, through the filmstrip traversing plane, and into an inoperative plane spaced away from the filmstrip traversing plane.

8. A combination as in claim 7 wherein the movable plate is supported on the viewer and at a position above the cassette.

9. A combination as in claim 7 wherein the movable plate is supported on the viewer by a parallogram linkage, the weight of the movable plate biasing said plate toward the normal filmstrip-engaging position.

10. A combination as in claim 6 wherein the filmstrip has microimages thereon arranged in rows along the length of the filmstrip, and columns perpendicular to the rows, the viewer having a carriage which is movable in directions parallel to the columns of microimages, means for mounting the cassette on the carriage, and the movable plate being supported on and movable with the carriage and with the cassette mounted on the carriage.

11. A combination as in claim 10 wherein the cassette is supported on the carriage with the filmstrip of the cassette facing upwardly, and the movable plate being supported from the carriage through a parallelogram linkage above the cassette.

12. A combination as in claim 10 wherein the source of light is positioned below the first transparent plate, so that light is projected through said first transparent plate in an upward direction, the cassette being supported below a portion of the carriage, and the second transparent plate being movably supported from said portion of the carriage through a parallelogram linkage.

13. In a viewer for illuminating, enlarging and displaying microimages from a selected portion of a filmstrip onto a viewing screen, the viewer including lens magnification and focusing means, microimage illumination and projection means, and an upper viewing screen; the viewer being used in association with a cassette wherein a filmstrip is moved from one spool to a second spool so as to present selected microimages for display; the improvement comprising, in combination:

a movable carriage supported from the viewer and carrying said cassette; the cassette including a fixed transparent plate over which the filmstrip passes; a movable, transparent plate secured, through a parallelogram linkage to the carriage and located in the path of light projected from the microimage illuminating means, the movable plate being adapted to engage one side of the selected portion of the filmstrip and to clamp the filmstrip against the fixed transparent plate of the cassette when the movable plate assumes a normal downwardly biased condition;

first and second manually movable controls for selectively initiating longitudinal movement of the filmstrip within the cassette at relatively high speed or relatively low speed; and bar means movable with the movable control that initiates movement of the filmstrip at relatively high speed, for engaging and moving the movable plate out of its normal, downwardly biased, filmstrip-engaging condition substantially simultaneously with initiating movement of the filmstrip at relatively high speed.

14. In a viewer for illuminating, enlarging and displaying microimages from a selected portion of a filmstrip onto a viewing screen, the viewer including lens magnification and focusing means, microimage illumination and projection means, and an upper viewing screen; the viewer being used in association with a cassette wherein a filmstrip is moved from one spool to a second spool so as to present selected microimages for display; the improvement comprising, in combination:

a movable carriage supported from the viewer and carrying said cassette; a movable, transparent plate secured, through a parallelogram linkage to the carriage and located in the path of light projected from the microimage illuminating means, the movable plate being adapted to engage one side of the selected portion of the filmstrip when the movable plate assumes a normal downwardly biased condition;

first and second manually movable controls for selectively initiating longitudinal movement of the filmstrip within the cassette at relatively high speed or relatively low speed;

means movable with the movable control that initiates movement of the filmstrip at relatively high speed, for engaging and moving the movable plate out of its normal, downwardly biased, filmstrip-engaging condition substantially simultaneously with initiating movement of the filmstrip at relatively high speed; the movable transparent plate being adapted to remain in engagement with one side of the selected filmstrip portion when the relatively low speed control means is activated, and means between said movable transparent plate and said parallelogram linkage that is operative to provide some limited movement of the movable plate in the direction of movement corresponding to the longitudinal movement of the filmstrip when the filmstrip is being moved at said relatively low speed.

* * * * *